Oct. 8, 1957 D. G. RENNO 2,808,914
AUTOMOBILE VENTILATOR WINDOW STRUCTURE
Filed March 14, 1955 3 Sheets-Sheet 3
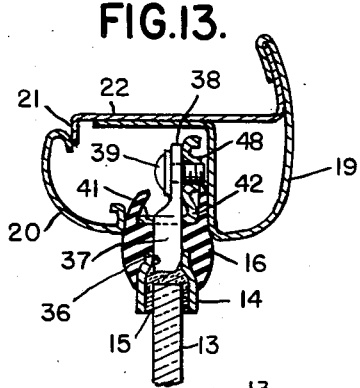
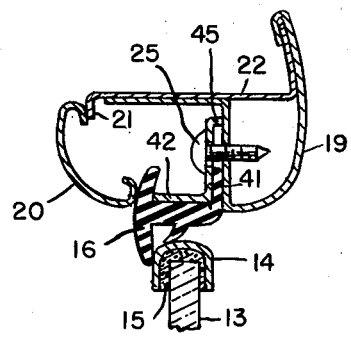
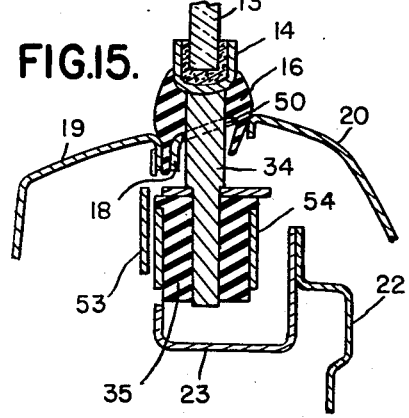
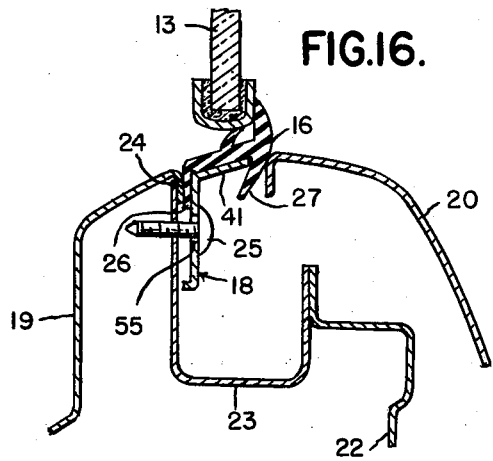
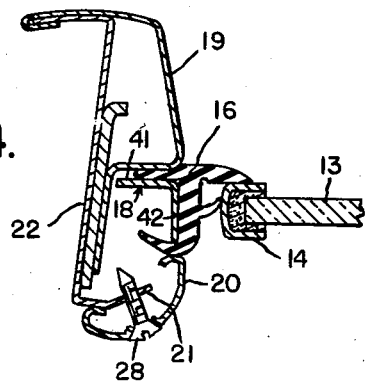
INVENTOR.
DONALD G. RENNO
BY Whittemore, Hulbert
Belknap
ATTORNEYS

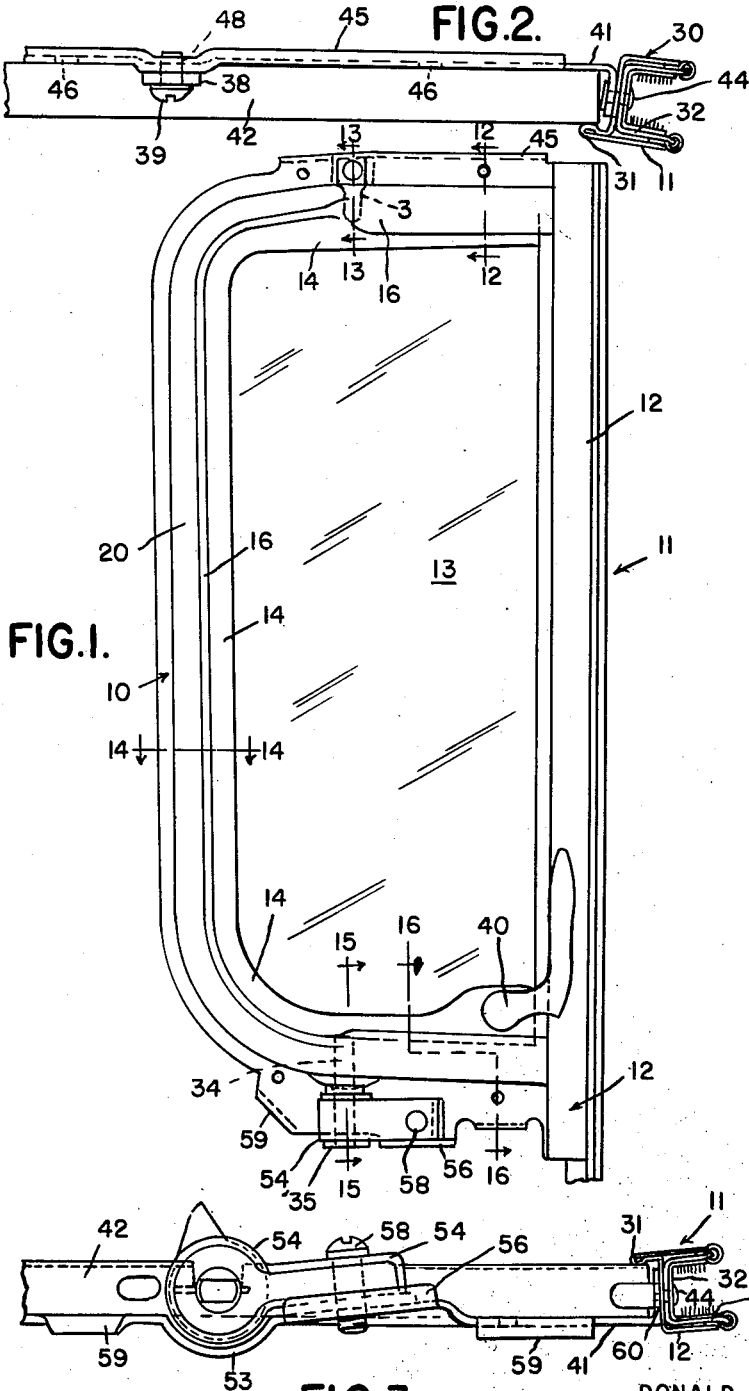

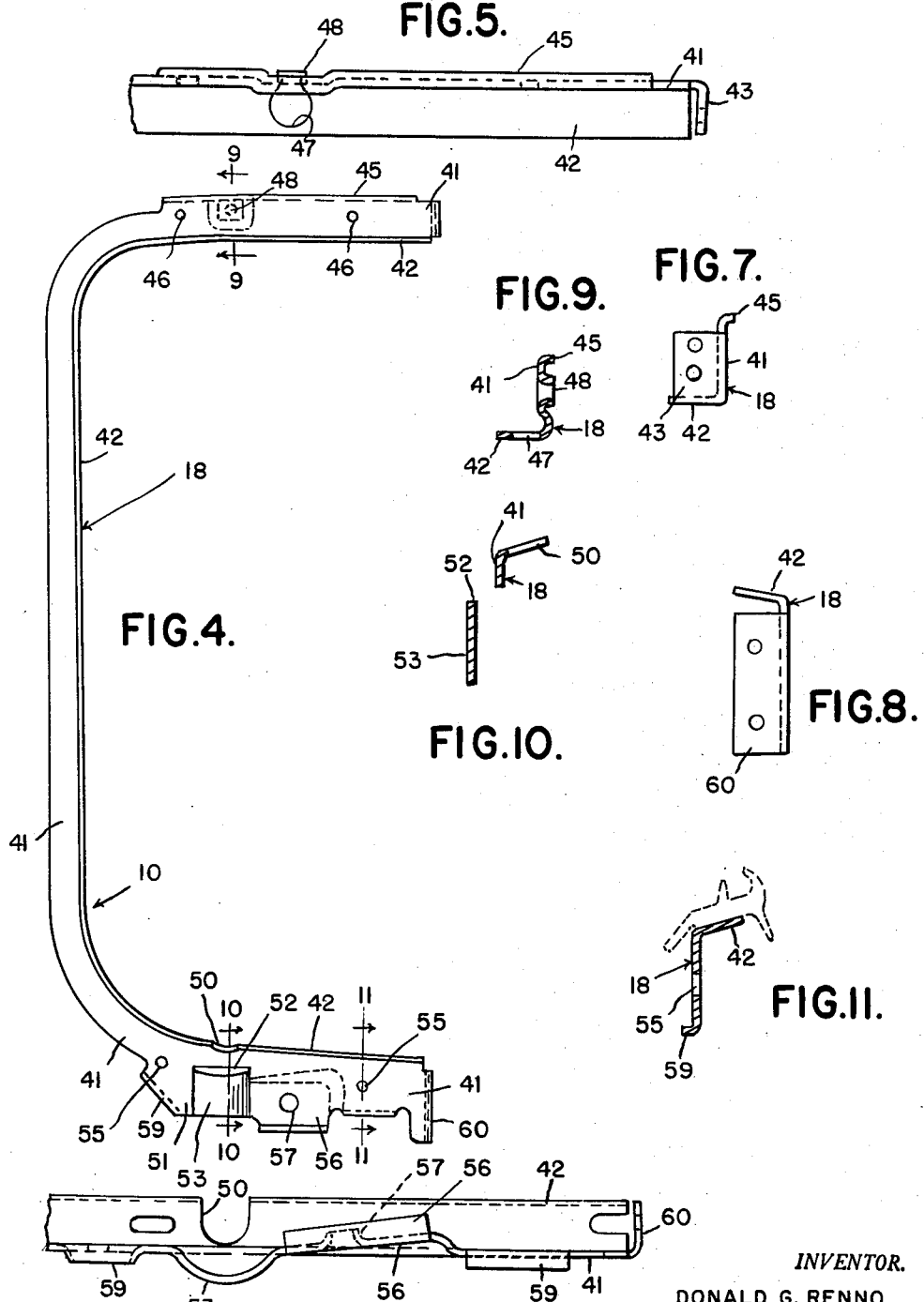

United States Patent Office 2,808,914
Patented Oct. 8, 1957

2,808,914

AUTOMOBILE VENTILATOR WINDOW STRUCTURE

Donald G. Renno, Birmingham, Mich., assignor to Motor Products Corporation, Detroit, Mich., a corporation of New York Application March 14, 1955, Serial No. 494,182

5 Claims. (Cl. 189—75)

The present invention relates to improvements in a ventilator window structure which have the effect of materially reducing the cost of a manufacture of an automotive door ventilator installation, especially in the fabrication of a fixed frame in which a transparent wing-like ventilator panel is mounted to swing about an upright axis. Material, labor and equipment costs in forming the frame, in assembling thereto necessary window stripping and panel pivoting elements, and in installing the thus fabricated ventilator structure to the door are much reduced, in comparison with conventional procedures.

The invention attains these desirable objects by a very substantial simplification and an integration of a U-shaped frame, by which a weatherstrip is retained and to which is ultimately secured an upright division pillar or bar to mount the assembly on the door, with structural provisions by which a ventilator panel is pivoted in the panel for swinging movement upon a substantial vertical axis, and is locked in closed position. In accordance with the invention the frame and pivot provisions are constituted as parts of an appropriately shaped and punched, one-piece sheet metal stamping.

Considered more particularly, the invention resides in improved provisions whereby such a weatherstrip retaining frame having integral means to receive pivots of a ventilator panel is easily and economically fabricated by simple blanking, piercing and forming operations performed on a single sheet metal piece of proper gauge. This eliminates time consuming, costly metal working operations involving multiple parts, as heretofore required for the panel pivoting means. Possible inaccuracy and misfit in the ultimate assembly are also avoided, since the necessary punching and slitting of the improved frame are correlated in a single piercing operation.

In accordance with the present day procedure in manufacturing ventilator frame structures of the above mentioned character, at least three or more essential parts are assembled in fixed relation to one another. One of them is a rolled, shaped and punched frame member or "hoop" of generally U-shaped outline, adapted to have a continuous length of flexible weatherstripping clamped or otherwise associated therewith to seal margins of a ventilator panel to be pivoted therein. The other parts are in the nature of brackets separately assembled with such frame, which brackets have proper provisions to mount axially aligned pivot elements by which the ventilator panel is swiveled in the frame, among other functions. The ends of the U-shaped frame member are rigidly secured to an upright division pillar or bar which in turn is secured to the door, thus completing a ventilator frame structure.

A number of operations of differing character are required in building up such a composite weatherstrip retainer and panel pivoting frame. First, a blank of appropriate outline is stamped out and then rolled in a desired angular or channeled cross-sectional configuration. Next it is shaped as a hoop in a U-shaped outline. It is then punched to afford screw or rivet openings, as for the attachment of necessary brackets. These are individual brackets by which the U-shaped frame member is secured to the division bar of the door, as well as attachment to the body at other points, and by which ventilator pivot members are affixed to the frame. Production of the brackets of course involves separate shaping and punching operations.

Finally, the assembly of the brackets to the frame is performed, usually by riveting, and misfitting of the rivet or screw holes is quite apt to occur due to inaccurate location or excessive clearance in punching the holes. Even disregarding this possibility, the manufacturing and assembling operations are costly in material and labor.

It is therefore an object of the present invention to simplify greatly the manufacture the procedure of an assembly of the frame by fabricating the same as an integral and self-contained weatherstrip retainer and panel pivot unit from a single length of stock, this being done by entirely conventional rolling, shaping and punching operations which can be performed in a fraction of the time required for the conventional procedures. A retainer and pivoting frame results which has attributes of strength, rigidity and reliable accuracy at least equal to those of a multi-part assembly. The improved frame is assembled to the weatherstrip, and to inner and outer panels of an automotive door and the usual garnish molding associated therewith, just as effectively and securely as in the more expensive built-up installations.

Another objective is to provide an improved assembly of a flexible weatherstrip member with a frame of the above character and with door members associated in a novel manner with the frame and weatherstrip.

The foregoing as well as other objects will be made more apparent as the discussion proceeds, especially when considered in connection with the accompanying drawings, wherein:

Fig. 1 is a fragmentary view in side elevation illustrating an installation of the approved retainer and pivot frame of the invention as part of a window ventilator unit;

Figs. 2 and 3 are, respectively, fragmentary top and bottom plan views in somewhat enlarged scale, of top and bottom portions of the installation of Fig. 1;

Fig. 4 is a fragmentary side elevational view, generally similar to Fig. 1, of the improved frame itself, with which the invention primarily deals;

Figs. 5 and 6 are, respectively, fragmentary top and bottom plan views in somewhat enlarged scale of the retainer frame of Fig. 4;

Figs. 7 and 8 are views in end elevation as viewed from the right of Figs. 5 and 6, respectively;

Figs. 9, 10 and 11 are views in somewhat enlarged section along lines 9—9, 10—10, and 11—11, respectively, of Fig. 4; and Figs. 12, 13, 14, 15 and 16 are fragmentary views in enlarged scale taken along lines 12—12, 13—13, 14—14, 15—15 and 16—16, respectively, of Fig. 1, illustrating the ultimate relationship of the improved panel pivoting and weatherstrip retainer frame, at various points about its outline, to inner and outer door panels and garnish moulding with which it is fixedly associated, as well as to the weatherstripping which is associated with those parts.

The pivot and retainer frame 10 of the invention is shown in a general way, in Figs. 1, 2 and 3, in its final assembly in a door ventilator installation 11 as a whole, which frame may be considered for the present to include a conventional upright division pillar or bar 12 secured at its bottom to a door (not shown) between the outer and inner panels of the latter. Bar 12 is disposed just forwardly of the usual vertically sliding door window. Details of the mounting of the assembly 10 on to the door constitute no part of the invention, hence require no further illustration or description.

A ventilator panel unit of the installation 11 is pivoted on an approximately upright axis in frame 10. This includes a panel 13 of clear glass or appropriate transparent plastic composition, and the panel 13 is fitted around its top, forward and bottom margins with a conventional glass retainer channel 14. Channel 14 receives the adjacent margins of panel 13 with a sealing strip 15 interposed, as illustrated in Figs. 12, 13 and 14.

The three margins of panel 13 mentioned are engaged and sealed, when the ventilator is closed in frame 10, by a continuous weatherstrip element 16 of appropriate, longitudinally varying cross-sectional outline. The weatherstrip is clamped to the frame by inner and outer door panels and an associated garnish molding in the fashion shown in Figs. 12 through 16, to which detailed reference will hereinafter be made. As shown in Figs. 4 through 11, frame 10 comprises, in addition to division bar 12, a continuous, one-piece bar member 18 of U-shaped outline and of generally L-shaped cross section throughout its length; and weatherstrip 16 is clamped to the flange edges of member 18, in the manner depicted in Figs. 12 through 16 of the drawings, by outer and inner door panels and a garnish molding. As shown in Figs. 12–16 strip 16 is secured about frame bar 18 by the clamping action of an outer door panel 19 and a coacting garnish molding 20, the garnish molding being removably secured to a flange 21 of an inner door panel 22. As illustrated in Fig. 16, inner door panel 22 may have welded thereto a U-shaped reinforcing bracket which is in turn welded to a downturned flange 24 of outer panel 19 to stiffen the construction otherwise. Garnish molding 20 is removably held in place on inner door frame 22 by means of a plurality of screws 28.

The division bar 12 is conventional in nature, being best indicated in Figs. 2 and 3. It includes a channel-shaped, upright bar member 30 having a forward extension 31 overlapping the adjacent rear margin of the ventilator window panel 13. Bar 30 internally receives a channel element 32 by which a forward edge of the vertically sliding door window (not shown) is received.

The transparent panel 13 carries pivot means on its retainer channel 14, approximately midway between the front and rear margins of the panel, by which the same is mounted for swinging movement within the opening defined by frame 10 and by the associated door panels 19, 22 and garnish molding 20. These pivot provisions, as best depicted in Figs. 13 and 15, considered in conjunction with Fig. 1, include a depending bottom pivot pin 34 secured as by welding to glass retainer 14 and extending through weatherstriping 16 and an appropriate opening in frame member 18, to be described. Pin 34 is received in an enlarged socket bushing 35, which in turn is supported on frame member 18 in a manner also to be described.

At its top margin, and in an axial alignment with bottom pivot pin 34, the glass retainer channel 14 is upwardly apertured at 36 to receive a small top pivot pin 37 (Fig. 13), which pin extends through weatherstripping 17 and frame member 18. It is flattened at its top, as indicated at 38, and is apertured to receive a securing screw 39 by which the pin 37 is secured to frame member 18.

As illustrated in Fig. 1, the channel-like glass retainer 14 has provision adjacent to its bottom and rear corner to receive a manual operating and latch member 40 of conventional type, by which the panel 13 is opened, closed and locked in closed relation to the ventilator window frame 10. The basic U-shaped member 18 of frame 10, with which the invention primarily deals, will now be described, with particular reference had to Figs. 4 through 11 of the drawings.

Member 18 is, as originally pointed out, produced by simple and rapidly performed rolling, piercing and shaping operations on a blank sheet metal strip, using entirely conventional high speed, mass production methods and equipment. It is rolled from such material in a properly shaped blank, and is accurately pierced to form rivet and screw holes, clearance openings, offset cuts, etc., in their desired ultimate number, size and placement. The blank is then subjected to two or three operations by which its various flanges and embossments are formed, after which it is formed into the U-shaped outline or "hoop" shown in Fig. 4, completing the frame member for final installation in the assembly 11 of Fig. 1.

Frame member 18 is essentially of L-shaped, angle outline throughout its entire length. This form includes a vertical and outwardly extending web 41 co-extensive with the length of the member and an inwardly extending flange 42. It will be noted by reference to Figs. 7, 9 and 14 that flange 42 is at a right angle to web 41 in the continuously connected top and forward, or lefthand, zones of frame member 18, as is viewed in Fig. 4, but that in the bottom zone the flange 42 assumes a milder, slightly upward angle to the web, as shown in Figs. 8, 10 and 11. At the outer righthand extremity of the top of the frame, as viewed in Fig. 4, the web 41 is cut free from flange 42 and is bent inwardly at 43 at an approximate right angle, thus to provide an attaching lip at which the frame is secured by a rivet or screw 44 to the top of division bar 12, as shown in Fig. 2.

The web 41 at the top of frame 18 is further provided with a small spacer and rigidifying enlargement or flange 45, bent outwardly in opposition to inner flange 42, and web 41 is also punched to provide spaced apertures 46. These take the screws 25 (Fig. 12) which clamp the frame 10 to the outer door frame 19 in this top zone.

Fig. 9 shows the formation of the web 41 and flange 42 to receive the top pivot pin 37 of the installation, the parts involved being also shown in Fig. 13. The flange is punched to provide a pivot opening 47 which upwardly receives pin 37, and the web is offset slightly inwardly and punched to afford an opening 48 in which the pin securing screw 39 for pivot pin 37 is threadedly received.

Provisions of equally simple nature are made at the bottom portion of frame member 18 to accommodate bottom pivot pin 34 of panel 13 and the bushing 35 journalling the same in the way shown in Fig. 15. To this end, the flange 42 is notched at 50, affording a clearance opening for pin 34, while the web 41 is widened at 51 to provide an enlarged metal area and slit longitudinally at 52, being embossed to afford a rounded clearance arc 53. This arc provides a lateral seat which accommodates the enlarged bushing 35 and a strap like clamp element 54 mounting the same to frame member 18, reference again being made to Fig. 15. Bottom web 41 is punched to provide apertures 55 which, like apertures 46 at the top of the frame 18, accommodate screws 25 clamping the weatherstrip 16 in place, in this case between the outer door panel 19 and reinforcing bracket 23. The enlargement of the web 41 at 51 affords strength to compensate for the piercing provisions described.

As shown in Figs. 4 and 6, web 41 is again widened at 56 and given a bent spacer lip 56, and is apertured at 57 to receive a screw 58 (Fig. 3) by which the clamping strap 54 for bushing 35 is mounted on frame member 18. This strap encircles the bushing and is engaged at its ends by screw 58 as shown in Fig. 1.

Other than in respect to the formation of other desired clearance openings, of no particular concern to the invention, the frame member 18 is completed by a reversely turned spacer flange 59 and an inturned terminal lip 60, by which the frame member 18 is attached to division bar 12 in the same way as at its top.

With reference to Figs. 12 through 16, it is seen that the weatherstrip 16 is effectively mounted by frame 18 between the garnish molding 20 and the outer door panel. The weatherstrip is bonded by vulcanizing to the inner surface of member 41 of the frame, with its outwardly projecting lips nested over the frame. One of these lips is restrained between outer door panel 19 and the flange 42 of the frame, while the other lip of the weatherstrip is secured by the molding 20 against the exposed edge of frame flange member 41. This enables a better conformation of the last named lip in reference to the frame, for it is flexed from an outwardly divergent position to the position of Figs. 12 through 16, and the garnish molding 20 takes an improved seat against the thus conformed lip.

A frame of angle, generally L-shaped cross sectional outline, in accordance with the invention, has the great advantage over a conventional frame of channeled or U-shaped sectional outline that its flanges may be designed in any desired width to accommodate necessary piercing for operating parts or the like. In the case of a U-shaped section, such piercing of the channel flanges or its web practically eliminates the pierced part at the area of piercing with a substantial reduction in strength as the result. Fully desired strength can be built into and maintained in a frame of angular sectional configuration.

What I claim as my invention is:

1. A frame structure for an automotive ventilator panel or the like, comprising an integral, one-piece frame of generally U-shaped outline and L-shaped cross section, said frame providing a web generally coplanar therewith and extending outwardly of said outline, and a flange extending transversely from the inner side of said web, and means on said frame to receive ventilator panel pivots aligned substantially parallel to said web, comprising an integral portion of said web which is located in one of the legs of said U-shaped outline and is of increased width, said portion being slitted and laterally embossed at one side of the slit to provide a seat to receive a panel pivot, the adjacent flange having an aperture in transverse alignment with said seat.

2. A frame construction for an automotive ventilator panel or the like, comprising an integral, one-piece frame of generally U-shaped outline and L-shaped cross section, said frame providing a web generally coplanar therewith and extending outwardly of said outline, and a flange extending transversely from the inner side of said web, said web and flange being substantially coextensive in length with the frame outline, and means on said frame to receive ventilator panel pivots aligned substantially parallel to said web, comprising an integral portion of said web which is located in one of the legs of said U-shaped outline and is of increased width, said portion being slitted and laterally embossed at one side of the slit to provide a seat to receive a panel pivot, the adjacent flange having an aperture in transverse alignment with said seat.

3. A frame construction for an automotive ventilator panel or the like, comprising an integral, one-piece frame of generally U-shaped outline and L-shaped cross section, said frame providing a web generally coplanar therewith and extending outwardly of said outline, and a flange extending transversely from the inner side of said web, said web and flange being substantially coextensive in length with the frame outline, and means on said frame to receive ventilator panel pivots aligned substantially parallel to said web, comprising an integral portion of said web which is located in one of the legs of said U-shaped outline and is of increased width, said portion being slitted and laterally outwardly embossed at one side of the slit, in the direction opposite the adjacent flange, to provide a seat to receive a panel pivot, the adjacent flange having an aperture in transverse alignment with said seat.

4. A frame construction for an automotive ventilator panel or the like, comprising an integral, one-piece frame of generally U-shaped outline and L-shaped cross section, said frame providing a web generally coplanar therewith and extending outwardly of said outline, and a flange extending transversely from the inner side of said web, and means on said frame to receive ventilator panel pivots aligned substantially parallel to said web, comprising an integral portion of said web which is located in one of the legs of said U-shaped outline and is of increased width, said portion being slitted and laterally embossed at one side of the slit to provide a seat to receive a panel pivot, the adjacent flange having an aperture in transverse alignment with said seat, the other opposed leg of said U-shaped outline being apertured in axial alignment with said last named aperture to receive the other panel pivot.

5. A frame construction for an automotive ventilator panel or the like, comprising an integral, one-piece frame of generally U-shaped outline and L-shaped cross section, said frame providing a web generally coplanar therewith and extending outwardly of said outline, and a flange extending transversely from the inner side of said web, said web and flange being substantially coextensive in length with the frame outline, and means on said frame to receive ventilator panel pivots aligned substantially parallel to said web, comprising an integral portion of said web which is located in one of the legs of said U-shaped outline and is of increased width, said portion being slitted and laterally outwardly embossed at one side of the slit, in the direction opposite the adjacent flange, to provide a seat to receive a panel pivot, the adjacent flange having an aperture in transverse alignment with said seat, the other opposed leg of said U-shaped outline being apertured in axial alignment with said last named aperture to receive the other panel pivot, said web having integral out-turned spacer flange elements on each of said legs extending oppositely of said frame flange.

References Cited in the file of this patent

UNITED STATES PATENTS

| | | |
|---|---|---|
| 2,020,896 | Lee | Nov. 12, 1935 |
| 2,041,804 | Woodward | May 26, 1936 |
| 2,053,854 | Vincent | Sept. 8, 1936 |
| 2,066,590 | Thorp et al. | Jan. 5, 1937 |
| 2,067,088 | Kellogg | Jan. 5, 1937 |
| 2,108,322 | Thorp | Feb. 15, 1938 |
| 2,133,199 | Kammerer | Oct. 11, 1938 |
| 2,140,844 | Mircus-Leuschner | Dec. 20, 1938 |
| 2,172,091 | Scott | Sept. 5, 1939 |
| 2,274,824 | Clark et al. | Mar. 3, 1942 |
| 2,361,609 | Doty | Oct. 31, 1944 |
| 2,676,055 | Humpal | Apr. 20, 1954 |